US010378768B2

(12) United States Patent
Cunha et al.

(10) Patent No.: US 10,378,768 B2
(45) Date of Patent: Aug. 13, 2019

(54) COMBUSTOR QUENCH APERTURE COOLING

(71) Applicant: United Technologies Corporation, Farmington, CT (US)

(72) Inventors: Frank J. Cunha, Avon, CT (US); Stanislav Kostka, Jr., Shrewsbury, MA (US)

(73) Assignee: United Technologies Corporation, Farmington, CT (US)

( * ) Notice: Subject to any disclaimer, the term of this patent is extended or adjusted under 35 U.S.C. 154(b) by 250 days.

(21) Appl. No.: 15/037,555

(22) PCT Filed: Dec. 4, 2014

(86) PCT No.: PCT/US2014/068569
§ 371 (c)(1),
(2) Date: May 18, 2016

(87) PCT Pub. No.: WO2015/085069
PCT Pub. Date: Jun. 11, 2015

(65) Prior Publication Data
US 2016/0290644 A1    Oct. 6, 2016

Related U.S. Application Data

(60) Provisional application No. 61/912,860, filed on Dec. 6, 2013.

(51) Int. Cl.
| | | |
|---|---|---|
| *F23R 3/00* | (2006.01) | |
| *F23R 3/06* | (2006.01) | |
| *F02C 7/18* | (2006.01) | |

(52) U.S. Cl.
CPC ............... *F23R 3/002* (2013.01); *F02C 7/18* (2013.01); *F23R 3/06* (2013.01);
(Continued)

(58) Field of Classification Search
CPC .... F23R 3/06; F23R 3/02; F23R 3/002; F23R 3/04; F23R 2900/03041; F23R 2900/03044
See application file for complete search history.

(56) References Cited

U.S. PATENT DOCUMENTS

| | | |
|---|---|---|
| 4,265,085 A | 5/1981 | Fox et al. |
| 4,302,941 A | 12/1981 | Dubell |

(Continued)

FOREIGN PATENT DOCUMENTS

| | | | |
|---|---|---|---|
| DE | 1947762 A1 * | 4/1970 | ................ F23R 3/04 |
| GB | 2017827 | 10/1979 | |

OTHER PUBLICATIONS

Extended EP Search Report dated Nov. 9, 2016.
Office action for U.S. Appl. No. 15/100,363 dated Mar. 28, 2019.

*Primary Examiner* — Lorne E Meade
*Assistant Examiner* — Christopher M Adams
(74) *Attorney, Agent, or Firm* — O'Shea Getz P.C.

(57) ABSTRACT

An assembly is provided for a turbine engine. This turbine engine assembly includes a combustor wall. The combustor wall includes a shell, a heat shield and an annular body. The annular body extends through the combustor wall and at least partially defines a quench aperture along a centerline through the combustor wall. The shell defines a first cooling aperture radially outwards of the annular body relative to the centerline and is configured to direct air to impinge against a portion of the annular body between the heat shield and the shell.

18 Claims, 17 Drawing Sheets

(52) U.S. Cl.
CPC ............... *F23R 2900/03041* (2013.01); *F23R 2900/03042* (2013.01); *F23R 2900/03044* (2013.01); *F23R 2900/03045* (2013.01)

(56) References Cited

U.S. PATENT DOCUMENTS

| | | | |
|---|---|---|---|
| 4,852,355 A | 8/1989 | Kenworthy et al. | |
| 5,461,866 A | 10/1995 | Sullivan et al. | |
| 5,687,572 A * | 11/1997 | Schrantz | F23R 3/007 431/352 |
| 5,758,503 A | 6/1998 | DuBell et al. | |
| 5,865,030 A | 2/1999 | Matsuhama | |
| 6,145,319 A * | 11/2000 | Burns | F23R 3/002 60/754 |
| 6,655,149 B2 * | 12/2003 | Farmer | F23R 3/06 60/754 |
| 7,093,441 B2 | 8/2006 | Burd et al. | |
| 7,146,815 B2 | 12/2006 | Burd | |
| 8,443,610 B2 | 5/2013 | Hoke et al. | |
| 8,499,566 B2 * | 8/2013 | Lacy | F23R 3/005 60/752 |
| 8,726,631 B2 | 5/2014 | Rudrapatna et al. | |
| 9,328,665 B2 * | 5/2016 | Doerr | F23R 3/007 |
| 2005/0022531 A1 * | 2/2005 | Burd | F23R 3/002 60/752 |
| 2008/0264064 A1 * | 10/2008 | Sze | F23R 3/002 60/752 |
| 2010/0095679 A1 | 4/2010 | Rudrapatna et al. | |
| 2010/0122537 A1 | 5/2010 | Yankowich et al. | |
| 2010/0287941 A1 | 11/2010 | Kim et al. | |
| 2011/0048024 A1 * | 3/2011 | Snyder | F23R 3/06 60/754 |
| 2011/0107766 A1 * | 5/2011 | Davis, Jr. | F23R 3/005 60/755 |
| 2011/0120132 A1 | 5/2011 | Rudrapatna et al. | |
| 2011/0185735 A1 | 8/2011 | Snyder | |
| 2011/0302924 A1 * | 12/2011 | Lee | F01D 9/023 60/752 |
| 2013/0025288 A1 | 1/2013 | Cunha et al. | |
| 2013/0028713 A1 * | 1/2013 | Giri | F16J 15/064 415/135 |
| 2014/0190171 A1 | 7/2014 | Critchley et al. | |

* cited by examiner

COMBUSTOR QUENCH APERTURE COOLING

CROSS-REFERENCE TO RELATED APPLICATION

This application claims priority to PCT Patent Application No. PCT/US14/068569 filed on Dec. 4, 2014, which claims priority to U.S. Provisional Patent Appln. No. 61/912,860 filed Dec. 6, 2013, which are hereby incorporated herein by reference in their entireties.

BACKGROUND OF THE INVENTION

1. Technical Field

This disclosure relates generally to a turbine engine and, more particularly, to a combustor of a turbine engine.

2. Background Information

A floating wall combustor for a turbine engine typically includes a bulkhead, an inner combustor wall and an outer combustor wall. The bulkhead extends radially between the inner and the outer combustor walls. Each combustor wall includes a shell and a heat shield that defines a respective radial side of a combustion chamber. Cooling cavities extend radially between the heat shield and the shell. These cooling cavities fluidly couple impingement apertures defined in the shell with effusion apertures defined in the heat shield.

Each combustor wall may also include a plurality of quench aperture grommets located between the shell and the heat shield. Each of the quench aperture grommets defines a respective quench aperture radially through the combustor wall. The quench aperture grommets as well as adjacent portions of the heat shield are typically subject to relatively high temperatures during engine operation, which can induce relatively high thermal stresses within the grommets and the heat shield.

There is a need in the art for an improved turbine engine combustor.

SUMMARY OF THE DISCLOSURE

According to an aspect of the invention, an assembly is provided for a turbine engine. This turbine engine assembly includes a combustor wall. The combustor wall includes a shell, a heat shield and an annular body. The annular body extends through the combustor wall and at least partially defines a quench aperture along a centerline through the combustor wall. The shell defines a first cooling aperture radially outwards of the annular body relative to the centerline and is configured to direct air to impinge against a portion of the annular body between the heat shield and the shell.

According to another aspect of the invention, an assembly is provided for a turbine engine. This turbine engine assembly includes a combustor wall. The combustor wall includes a shell, a heat shield and an annular body. The body extends between the shell and the heat shield. The body defines a quench aperture in the combustor wall. A funnel-shaped portion of the shell extends around the body. The funnel-shaped portion of the shell defines a cooling aperture that is fluidly coupled with a cooling cavity between the shell and the heat shield.

According to another aspect of the invention, an assembly is provided for a turbine engine. This turbine engine assembly includes a combustor wall. The combustor wall includes a shell, a heat shield and an annular body. The body extends between the shell and the heat shield. The body defines a quench aperture in the combustor wall. The shell defines a cooling aperture that extends along an axis with a trajectory to the body. The cooling aperture is fluidly coupled with a cooling cavity between the shell and the heat shield.

The funnel-shaped portion of the shell may be adapted to direct air through the cooling aperture and into the cooling cavity to impinge against the body.

A portion of the shell may be non-parallel with an opposing portion of the heat shield. The portion of the shell may define the cooling aperture.

A funnel-shaped portion of the shell may extend around the body and define the cooling aperture. The funnel-shaped portion of the shell may have a substantially straight sectional geometry. Alternatively, the funnel-shaped portion of the shell may have an arcuate sectional geometry. Still alternatively, the funnel-shaped portion of the shell may have a compound sectional geometry.

The shell includes a second portion. The funnel-shaped portion may extend laterally from the second portion towards the body. The second portion may be substantially parallel with an opposing portion of the heat shield.

A first angle of incidence may be defined relative to a centerline of the first cooling aperture and a surface of the shell. The shell may also define a second cooling aperture through which air is directed to impinge against an outer surface of the portion of the body. A second angle of incidence may be defined relative to a centerline of the second cooling aperture and the surface of the shell. The second angle of incidence may be different than (or the same as) the first angle of incidence.

The portion of the body may include an outer surface which defines one or more ribs. At least a portion of one or more of the ribs may each be configured as or otherwise include a chevron.

The portion of the body may include an outer surface which defines one or more point protrusions.

The portion of the body may include an outer surface which defines one or more channels that extend into the body.

A sleeve may extend around the body and extend vertically from the heat shield towards the shell.

The heat shield may include a plurality of panels that are attached to the shell. The body may be connected to one of the panels.

A combustor bulkhead may extend between the combustor wall and a second combustor wall. The heat shield, the second combustor wall and the combustor bulkhead may define a combustion chamber.

The foregoing features and the operation of the invention will become more apparent in light of the following description and the accompanying drawings.

DETAILED DESCRIPTION OF THE INVENTION

Figure 1:
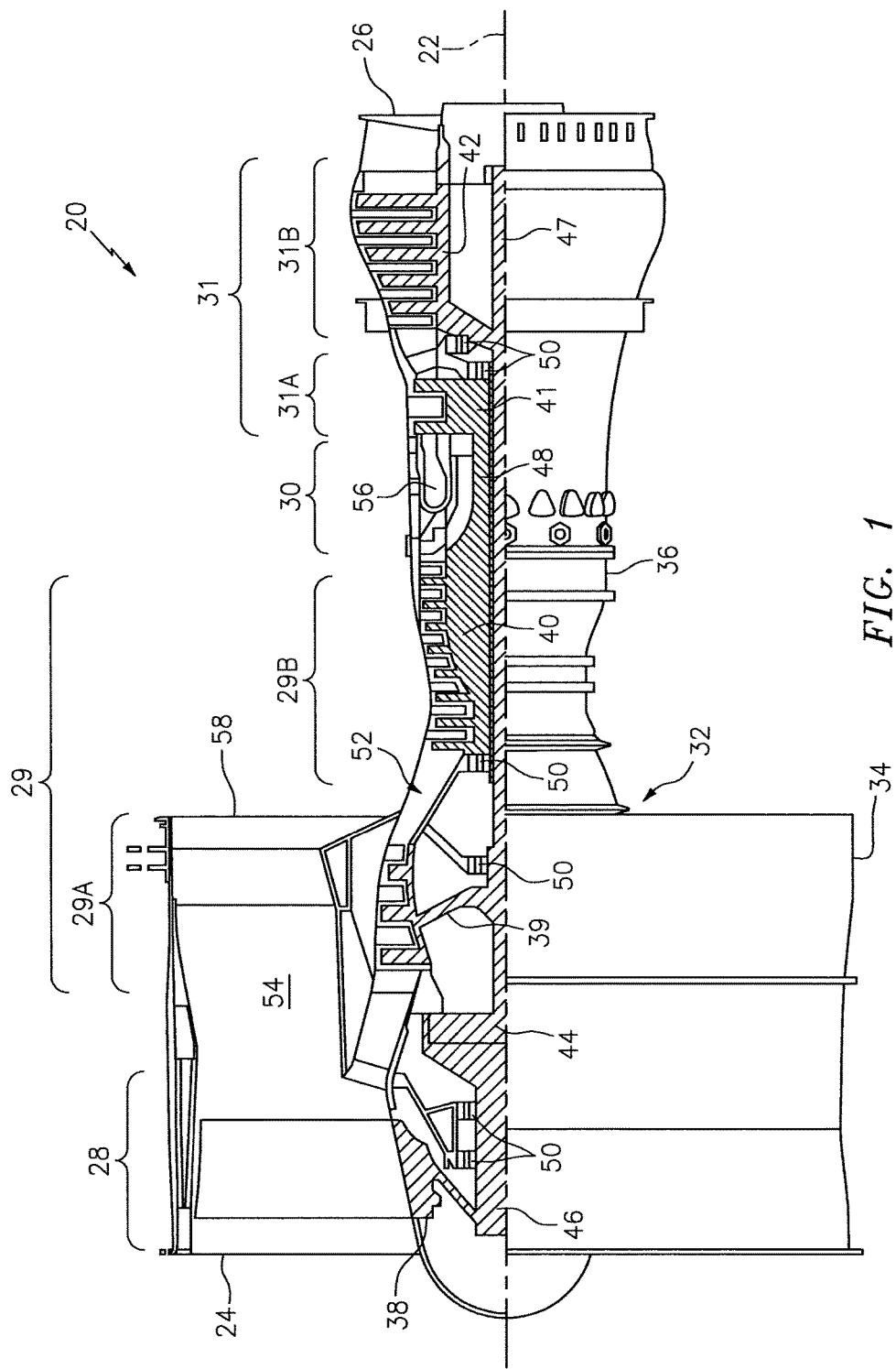
FIG. 1 is a side cutaway illustration of a geared turbine engine.

FIG. 1 is a side cutaway illustration of a geared turbine engine 20. The turbine engine 20 extends along an axial centerline 22 between a forward and upstream airflow inlet 24 and an aft and downstream airflow exhaust 26. The turbine engine 20 includes a fan section 28, a compressor section 29, a combustor section 30 and a turbine section 31. The compressor section 29 includes a low pressure compressor (LPC) section 29A and a high pressure compressor (HPC) section 29B. The turbine section 31 includes a high pressure turbine (HPT) section 31A and a low pressure turbine (LPT) section 31B. The engine sections 28-31 are arranged sequentially along the centerline 22 within an engine housing 32, which includes a first engine case 34 and a second engine case 36.

Each of the engine sections 28, 29A, 29B, 31A and 31B includes a respective rotor 38-42. Each of the rotors 38-42 includes a plurality of rotor blades arranged circumferentially around and connected to one or more respective rotor disks. The rotor blades, for example, may be formed integral with or mechanically fastened, welded, brazed, adhered or otherwise attached to the respective rotor disk(s).

The fan rotor 38 is connected to a gear train 44 through a fan shaft 46. The gear train 44 and the LPC rotor 39 are connected to and driven by the LPT rotor 42 through a low speed shaft 47. The HPC rotor 40 is connected to and driven by the HPT rotor 41 through a high speed shaft 48. The shafts 46-48 are rotatably supported by a plurality of bearings 50. Each of the bearings 50 is connected to the second engine case 36 by at least one stationary structure such as, for example, an annular support strut.

Air enters the turbine engine 20 through the airflow inlet 24, and is directed through the fan section 28 and into an annular core gas path 52 and an annular bypass gas path 54. The air within the core gas path 52 may be referred to as "core air". The air within the bypass gas path 54 may be referred to as "bypass air".

The core air is directed through the engine sections 29-31 and exits the turbine engine 20 through the airflow exhaust 26. Within the combustor section 30, fuel is injected into a combustion chamber 56 and mixed with the core air. This fuel-core air mixture is ignited to power the turbine engine 20 and provide forward engine thrust. The bypass air is directed through the bypass gas path 54 and out of the turbine engine 20 through a bypass nozzle 58 to provide additional forward engine thrust. Alternatively, the bypass air may be directed out of the turbine engine 20 through a thrust reverser to provide reverse engine thrust.

Figure 2:
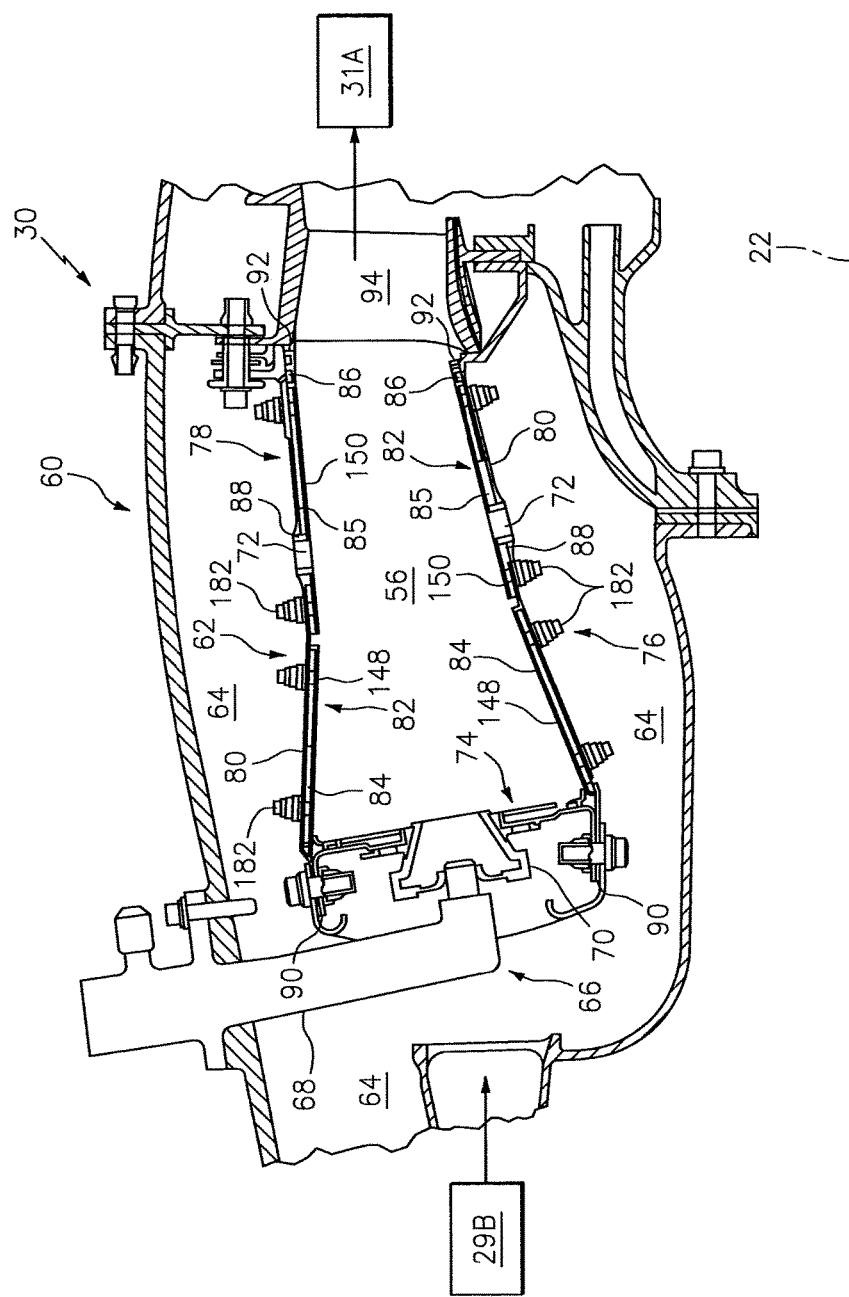
FIG. 2 is a side cutaway illustration of a portion of a combustor section.

FIG. 2 illustrates an assembly 60 of the turbine engine 20. The turbine engine assembly 60 includes a combustor 62 disposed within a plenum 64 of the combustor section 30. This plenum 64 receives compressed core air from the HPC section 29B, and provides the received core air to the combustor 62 as described below in further detail.

The turbine engine assembly 60 also includes one or more fuel injector assemblies 66. Each fuel injector assembly 66 may include a fuel injector 68 mated with a swirler 70. The fuel injector 68 injects the fuel into the combustion chamber 56. The swirler 70 directs some of the core air from the plenum 64 into the combustion chamber 56 in a manner that facilitates mixing the core air with the injected fuel. Quench apertures 72 in walls of the combustor 62 direct additional core air into the combustion chamber 56 for combustion; e.g., to stoichiometrically lean the fuel-core air mixture.

Figure 3:
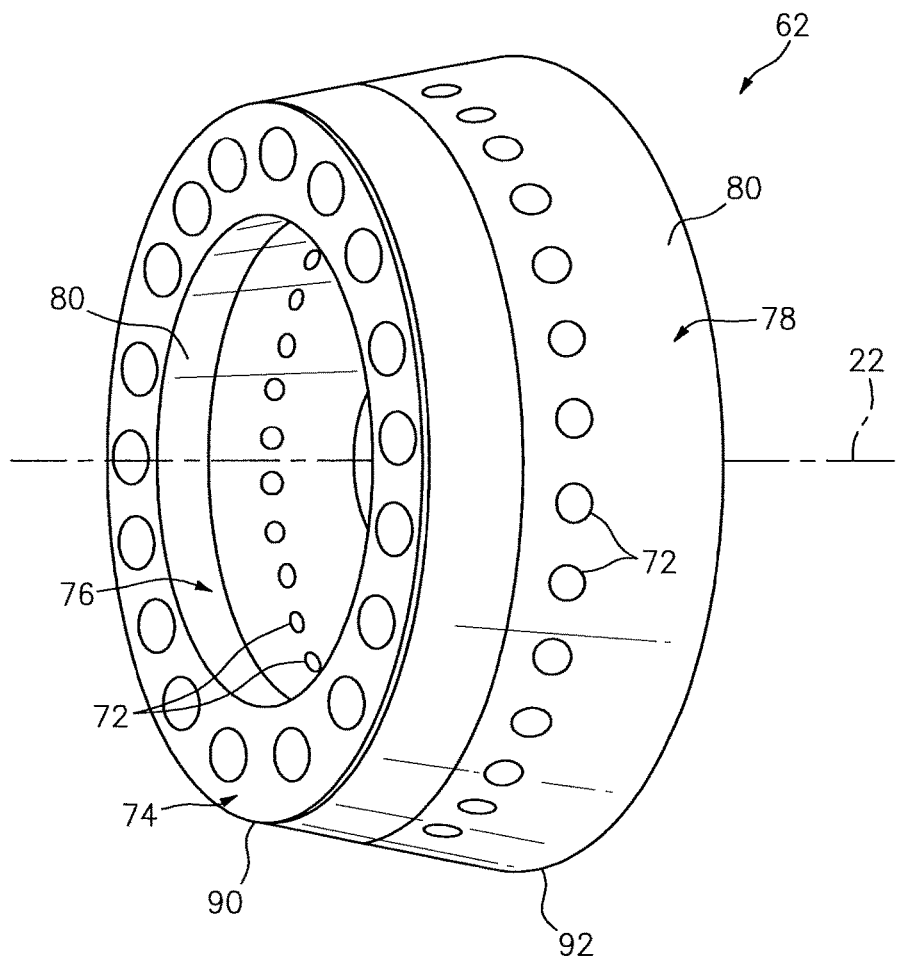
FIG. 3 is a perspective illustration of a portion of a combustor.

The combustor 62 may be configured as an annular floating wall combustor. The combustor 62 of FIGS. 2 and 3, for example, includes an annular combustor bulkhead 74, a tubular combustor inner wall 76, and a tubular combustor outer wall 78. The bulkhead 74 extends radially between and is connected to the inner wall 76 and the outer wall 78. The inner wall 76 and the outer wall 78 each extends axially along the centerline 22 from the bulkhead 74 towards the HPT section 31A, thereby defining the combustion chamber 56.

Figure 4:
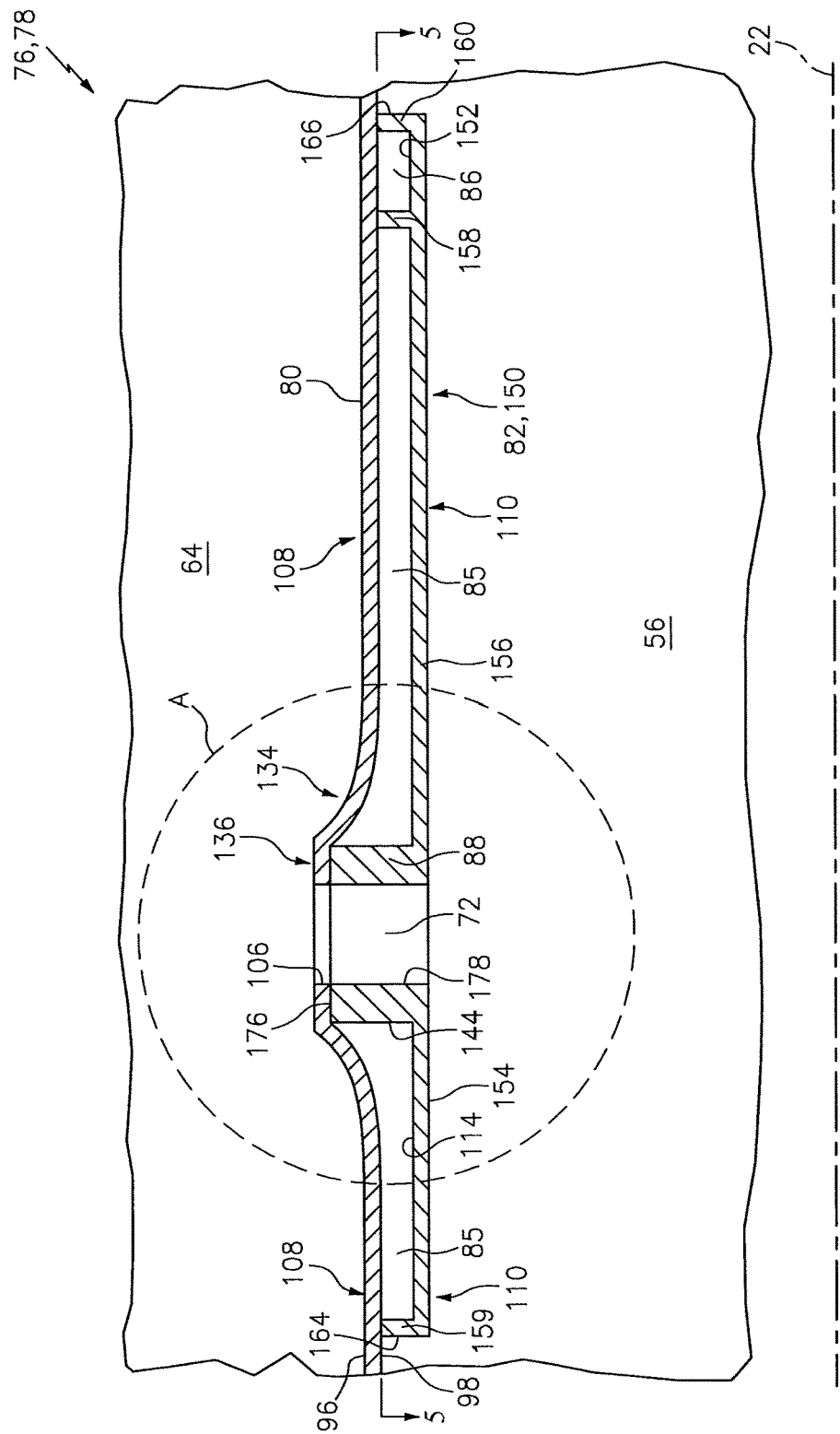
FIG. 4 is a side sectional illustration of a portion of a combustor wall.
Figure 5:
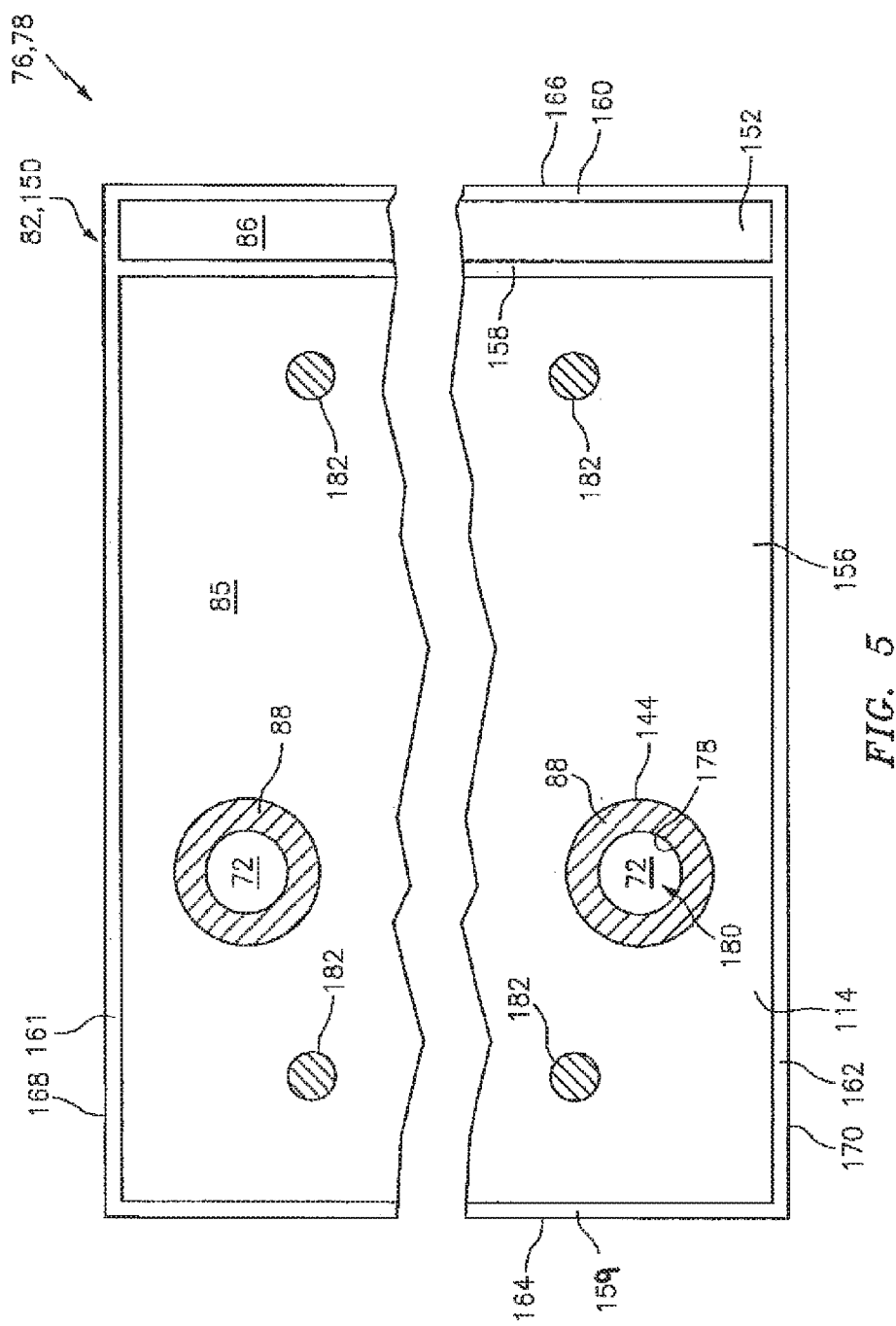
FIG. 5 is a sectional illustration of a portion of the combustor wall of FIG. 4.
Figure 6:
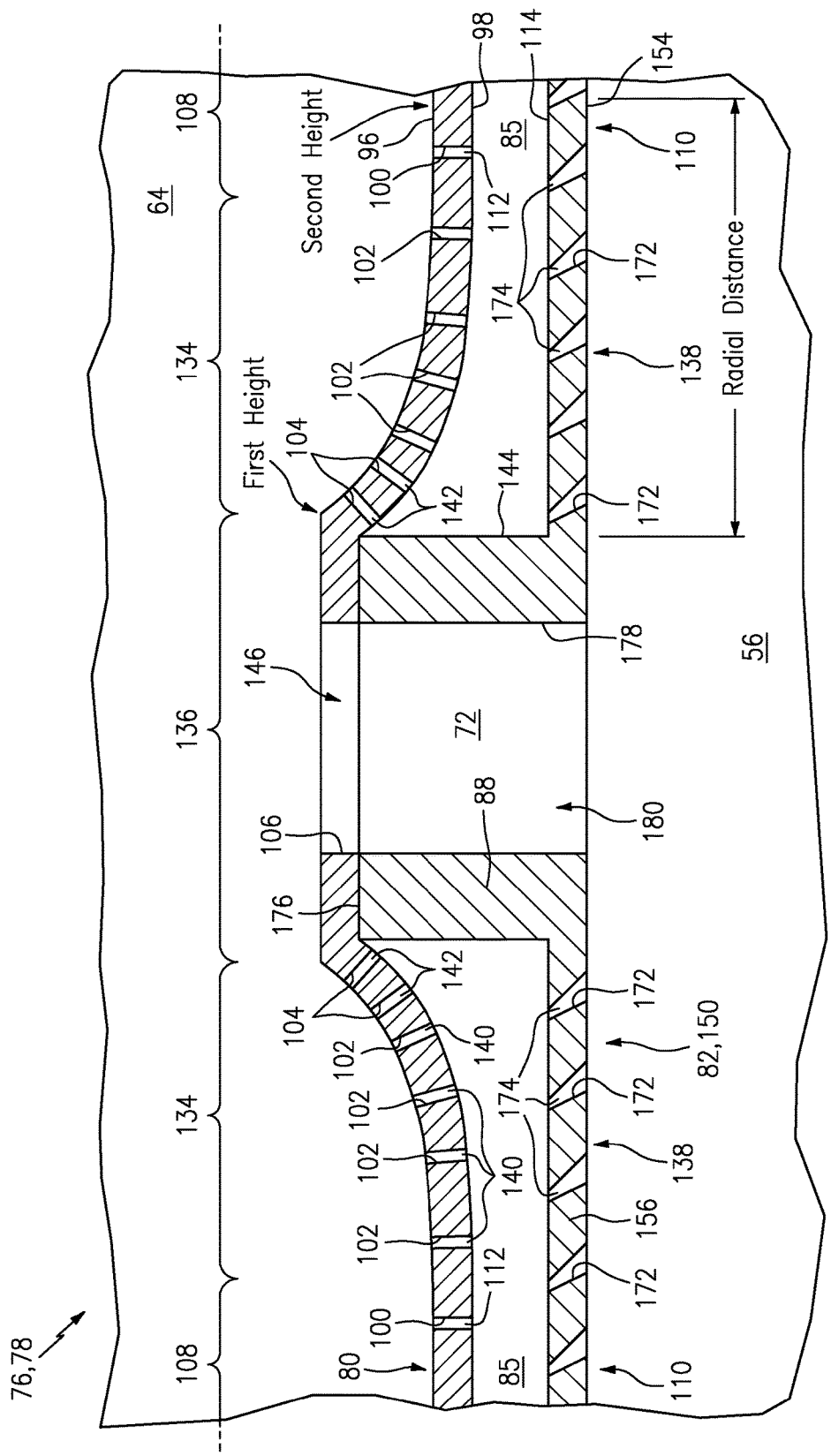
FIG. 6 is a detailed side sectional illustration of a portion A of the combustor wall of FIG. 4.
Figure 7:
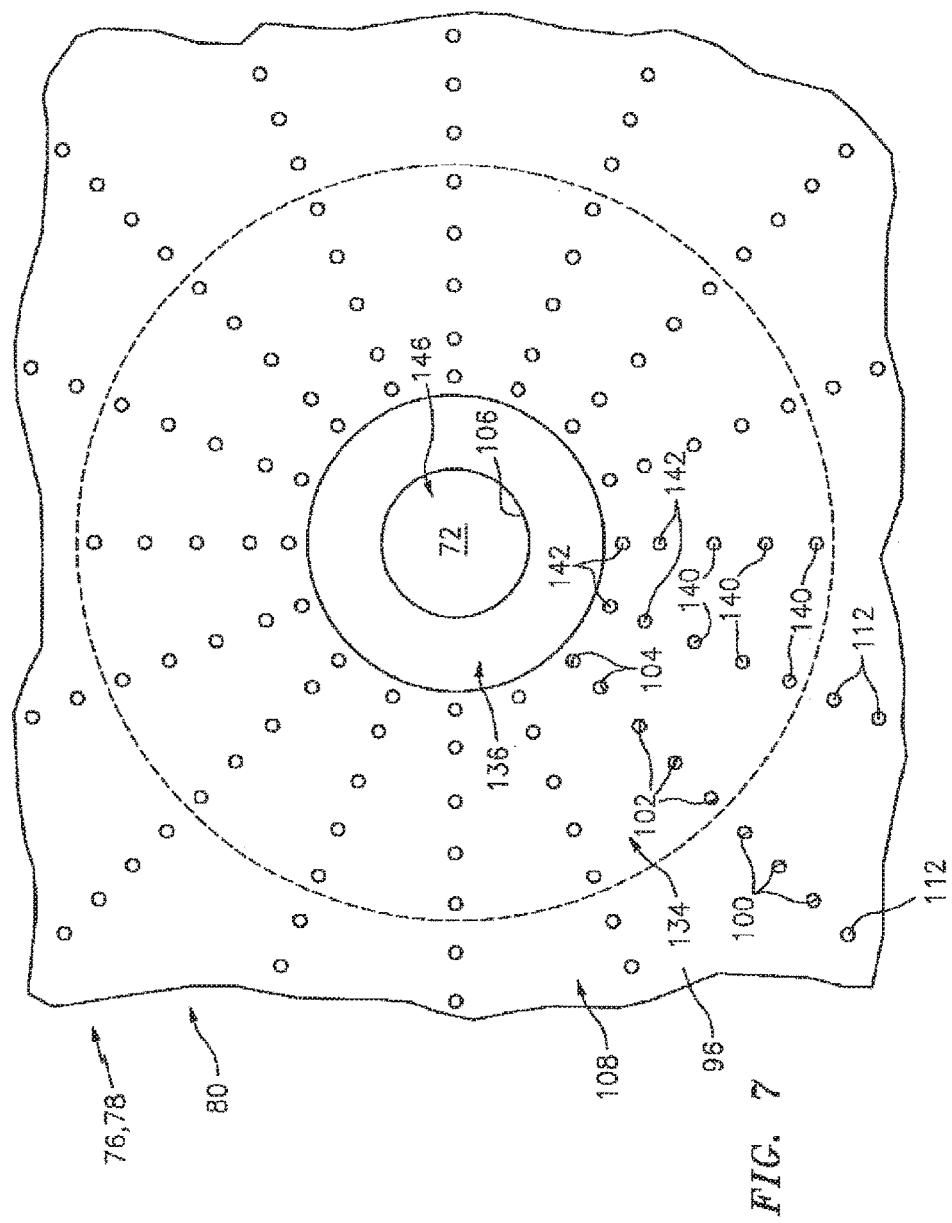
FIG. 7 is a detailed side illustration of the portion A of the combustor wall of FIG. 4.

FIG. 4 is a side sectional illustration of an exemplary downstream portion of one of the combustor walls 76, 78. FIG. 5 is a sectional illustration of a portion of the combustor wall 76, 78 of FIG. 4. FIG. 6 is a detailed side sectional illustration of a portion A of the combustor wall 76, 78 of FIG. 4. FIG. 7 is a detailed side illustration of the portion A of the combustor wall 76, 78 of FIG. 4. It should be noted that some details of the combustor wall 76, 78 shown in FIGS. 6 and 7 are not shown in FIGS. 2, 4 and 5 for ease of illustration.

Referring to FIGS. 2 and 4-7, the inner and the outer walls 76 and 78 may each be configured as a multi-walled structure; e.g., a hollow dual-walled structure. The inner and the outer walls 76 and 78 of FIGS. 2 and 4-7, for example, each includes a tubular combustor shell 80, a tubular combustor heat shield 82, and one or more cooling cavities 84-86 (e.g., impingement cavities) between the shell 80 and the heat shield 82. The inner wall 76 and the outer wall 78 may also each include one or more annular quench aperture bodies 88 (e.g., grommets). These quench aperture bodies 88 are disposed circumferentially around the centerline 22. Each quench aperture body 88 partially or completely defines a respective one of the quench apertures 72 (see also FIG. 3) as described below in further detail.

Referring to FIG. 2, the shell 80 extends circumferentially around the centerline 22. The shell 80 extends axially along the centerline 22 between an axial forward end 90 and an axial aft end 92. The shell 80 is connected to the bulkhead 74 at the forward end 90. The shell 80 may be connected to a stator vane assembly 94 or the HPT section 31A at the aft end 92.

Referring to FIGS. 4, 6 and 7, the shell 80 has an exterior surface 96, an interior surface 98, one or more aperture surfaces 100, one or more aperture surfaces 102, one or more aperture surfaces 104, and one or more aperture surfaces 106. One or more portions of the shell 80 extend (e.g., radially) between the shell exterior surface 96 and the shell interior surface 98. The shell exterior surface 96, which may also be referred to as a plenum surface, defines a portion of a boundary of the plenum 64. The shell interior surface 98, which may also be referred to as a cavity surface, defines a portion of a boundary of one or more of the cavities 84-86 (see FIG. 2).

The aperture surfaces 100 may be arranged in one or more arrays disposed along the centerline 22. The aperture surfaces 100 in each array, for example, may be arranged circumferentially around the centerline 22. The aperture surfaces 100 are defined by and located in a base portion 108 of the shell 80. This shell base portion 108 has a generally tubular geometry and is configured substantially parallel with an opposing base portion 110 of the heat shield 82 (see FIGS. 2 and 4), which also has a generally tubular geometry.

Figure 8:
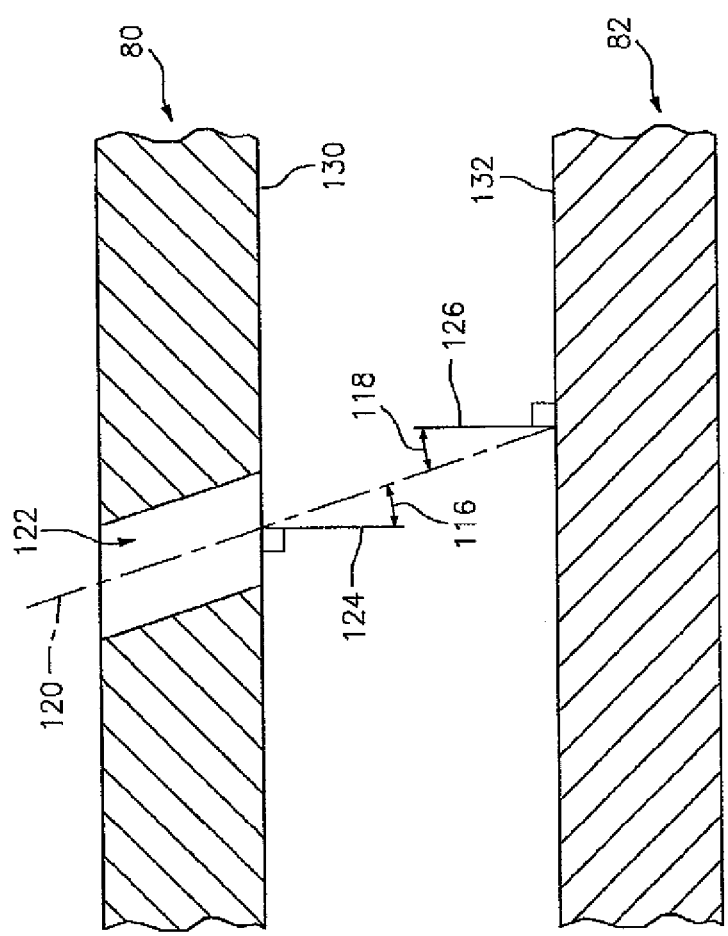
FIGS. 8-11 are side-sectional illustrations of respective portions of alternate embodiment combustor walls.

Each of the aperture surfaces 100 defines a cooling aperture 112. Each cooling aperture 112 extends vertically through the shell 80 from the shell exterior surface 96 to the shell interior surface 98. Each cooling aperture 112 may be configured as an impingement aperture. Each aperture surface 100 of FIG. 6, for example, is configured to direct a jet of cooling air to impinge substantially against the heat shield 82. One or more of the cooling apertures 112 and, thus, the aperture surfaces 100 may each be configured with a substantially zero angle of incidence relative to one or more of the surfaces 96 and 98 as well as a respective interior surface 114 of the heat shield 82. Referring to FIG. 8, the term "angle of incidence" may describe an angle 116, 118 between a centerline 120 of a cooling aperture 122 and a respective axis 124, 126 extending perpendicularly out from a surface 130 adjacent or a surface 132 opposite the cooling aperture 122. Of course, in other embodiments, one or more of the cooling apertures 112 of FIG. 6 may have a non-zero angle of incidence relative to one or more of the surfaces 96, 98 and 114.

Referring to FIGS. 4, 6 and 7, the aperture surfaces 102 may be arranged in one or more groupings. Each grouping of the aperture surfaces 102 is generally circumferentially and axially aligned with a respective one of the quench aperture bodies 88 and around a respective one of the aperture surfaces 106. The aperture surfaces 102 in each grouping may be defined by and located in a respective funnel-shaped portion 134 of the shell 80.

The funnel-shaped portion 134 extends around a respective one of the quench aperture bodies 88 and its quench aperture 72. Each quench aperture body extends a first height away from the interior surface 114. The funnel-shaped portion 134 is connected to the shell base portion 108 and a respective annular mounting portion 136 of the shell 80. The funnel-shaped portion 134 is defined by a second height from the interior surface 114 located a radial distance away from each quench aperture body 88. The funnel-shaped portion 134 extends laterally (e.g., circumferentially and/or axially) and vertically, in a direction away from the respective heat shield 82, between the shell base portion 108 and respective shell mounting portion 136. The funnel-shaped portion 134 may be configured non-parallel with (e.g., acutely angled to) an opposing portion 138 of the heat shield 82 (see FIGS. 2 and 4), which may have a similar geometry as the heat shield base portion 110.

Each of the aperture surfaces 102 defines a cooling aperture 140. Each cooling aperture 140 extends vertically and/or laterally through the shell 80 from the shell exterior surface 96 to the shell interior surface 98. Each cooling aperture 140 may be configured as an impingement aperture. Each aperture surface 102 of FIG. 6, for example, is configured to direct a jet of cooling air to impinge substantially against the heat shield 82. One or more of the cooling apertures 140 and, thus, the aperture surfaces 102 may each be configured with a substantially zero angle of incidence relative to one or more of the surfaces 96 and 98. Due to the geometry of the funnel-shaped portion 134, however, one or more of the cooling apertures 140 and, thus, the aperture surfaces 102 may also be configured with a non-zero angle of incidence relative to the respective interior surface 114 of the heat shield 82. Of course, in other embodiments, the one or more of the cooling apertures 140 may each have a non-zero angle of incidence relative to one or more of the surfaces 96 and 98.

Referring to FIGS. 4, 6 and 7, the aperture surfaces 104 may be arranged in one or more groupings. Each grouping of the aperture surfaces 104 is generally circumferentially and axially aligned with a respective one of the quench aperture bodies 88 and/or a respective one of the aperture surface 102 groupings. The aperture surfaces 104 in each grouping may be defined by and located in the funnel-shaped portion 134 of the shell 80. More particularly, the aperture surfaces 104 are located laterally between the respective aperture surface 102 grouping and the respective shell mounting portion 136.

Each of the aperture surfaces 104 defines a cooling aperture 142. Each cooling aperture 142 extends vertically and/or laterally through the shell 80 from the shell exterior surface 96 to the shell interior surface 98. Each cooling aperture 142 may be configured as an impingement aperture. In accordance with various embodiments of the present disclosure, a number of aperture surfaces 104 of FIG. 6, for example, are configured to direct a jet of cooling air to impinge substantially against an outer surface 144 of the respective quench aperture body 88. One or more of the cooling apertures 142 and, thus, the aperture surfaces 104 may each be configured with a substantially zero angle of incidence relative to one or more of the surfaces 96 and 98. It will be appreciated that due to the geometry of the funnel-shaped portion 134, however, one or more of the cooling apertures 142 and, thus, the aperture surfaces 104, may also be configured with a non-zero angle of incidence relative to the body outer surface 144, and thus impinge upon body outer surface 144 to a degree corresponding to the angle and proximity to wall 144. Of course, in other embodiments, the one or more of the cooling apertures 142 in the funnel-shaped portion 134 may each have a non-zero angle of incidence relative to one or more of the surfaces 96 and 98 and/or a substantially zero angle of incidence relative to the body outer surface 144.

Referring to FIGS. 6 and 7, the aperture surfaces 106 may be arranged in a circumferential array. Each aperture surface 106 is defined by and located in a respective one of the shell mounting portions 136. Each aperture surface 106 defines a portion of a respective one of the quench apertures 72. Each aperture surface 106, for example, defines a through-hole 146 that extends through the shell 80 from the shell exterior surface 96 to the shell interior surface 98. In alternative embodiments, however, each aperture surface 106 may be adapted to abut against and form a seal with a respective one of the quench aperture bodies 88.

Referring to FIG. 2, the heat shield 82 extends circumferentially around the centerline 22. The heat shield 82 extends axially along the centerline 22 between an axial forward end and an axial aft end. The forward end is located at an interface between the combustor wall 76, 78 and the bulkhead 74. The aft end may be located at an interface between the combustor wall 76, 78 and the stator vane assembly 94 or the HPT section 31A.

The heat shield 82 may include one or more heat shield panels 148 and 150, one or more of which may have an arcuate geometry. The panels 148 and 150 are respectively arranged at discrete locations along the centerline 22. The panels 148 are disposed circumferentially around the centerline 22 and form a forward hoop. The panels 150 are disposed circumferentially around the centerline 22 and form an aft hoop. Alternatively, the heat shield 82 may be configured from one or more tubular bodies.

Referring to FIGS. 4 and 5, each of the panels 150 has one or more interior surfaces 114 and 152 and an exterior surface 154. At least a portion of the panel 150 extends (e.g., radially) between the interior surfaces 114 and 152 and the exterior surface 154. Each interior surface 114, which may also be referred to as a cavity surface, defines a respective one of the cooling cavities 85. Each interior surface 152, which may also be referred to as a cavity surface, defines a respective one of the cooling cavities 86. The exterior surface 154, which may also be referred to as a chamber surface, defines a portion of the combustion chamber 56.

Each panel 150 includes a panel base 156 and one or more rails 158-162. The panel base 156 and the panel rails 158, 159, 161 and 162 may collectively define the interior surface 114. The panel base 156 and the panel rails 158 and 160-162 may collectively define the interior surface 152. The panel base 156 may define the exterior surface 154.

The panel base 156 may be configured as a generally curved (e.g., arcuate) plate. The panel base 156 extends axially between an axial forward end 164 and an axial aft end 166. The panel base 156 extends circumferentially between opposing circumferential ends 168 and 170.

The panel rails may include an axial intermediate rail 158, one or more axial end rails 159 and 160, and one or more circumferential end rails 161 and 162. Each of the panel rails 158-162 of the inner wall 76 extends radially in from the respective panel base 156; see FIG. 2. Each of the panel rails 158-162 of the outer wall 78 extends radially out from the respective panel base 156; see FIG. 2.

The axial intermediate and end rails 158-160 extend circumferentially between and are connected to the circumferential end rails 161 and 162. The axial intermediate rail 158 is disposed axially between the axial end rails 159 and 160. The axial end rail 159 is arranged at (e.g., on, adjacent or proximate) the forward end 164. The axial end rail 160 is arranged at the aft end 166. The circumferential end rail 161 is arranged at the circumferential end 168. The circumferential rail 162 is arranged at the circumferential end 170.

Referring to FIG. 6, each panel 150 may also have one or more aperture surfaces 172. These aperture surfaces 172 may be respectively arranged in one or more arrays disposed along the centerline 22. The aperture surfaces 172 in each array may be disposed circumferentially around the centerline 22.

Each of the aperture surfaces 172 defines a cooling aperture 174 in the panel 150 and, thus, the heat shield 82. Each cooling aperture 174 may extend vertically and/or laterally through the panel base 156. Each cooling aperture 174 may be configured as an effusion aperture. Each aperture surface 172 of FIG. 6, for example, is configured to direct a jet of cooling air into the combustion chamber 56 to film cool a downstream portion of the heat shield 82. One or more of the cooling apertures 174 and, thus, the aperture surfaces 172 may each be configured with non-zero angle of incidence relative to one or more of the surfaces 114 and 154; e.g., between about 70° and about 85° relative to the surface 114 and/or between about 15° and about 30° relative to the surface 154. Of course, in other embodiments, the one or more of the cooling apertures 174 may each have a substantially zero angle of incidence relative to one or more of the surfaces 114 and 154.

Referring to FIGS. 4-6, each of the quench aperture bodies 88 is formed integral with or attached to a respective one of the panel bases 156. One or more of the quench aperture bodies 88 are arranged within a respective one of the cooling cavities 85. One or more of the quench aperture bodies 88, for example, may be arranged circumferentially between the circumferential end rails 161 and 162 of a respective one of the panels 150. One or more of the quench aperture bodies 88 may be arranged axially between the end rail 159 and the intermediate rail 158 of a respective one of the panels 150.

Each quench aperture body 88 extends vertically from the panel base 156 to a distal end surface 176, which engages (e.g., contacts) and forms a seal with the interior surface 98 of a respective one of the shell mounting portions 136. Each quench aperture body 88 extends laterally between an inner surface 178 and the respective body outer surface 144. The body inner surface 178 is circumferentially and axially aligned with a respective one of the aperture surfaces 106. The body inner surface 178 defines at least a portion of a respective one of the quench apertures 72. The body inner surface 178, for example, defines a through-hole 180 that extends through the panel 150 from the distal end surface 176 to the exterior surface 154. The body inner surface 178 may have a circular cross-sectional geometry. The body outer surface 144 may also have a circular cross-sectional geometry. Of course, in other embodiments, one or more of the surfaces 144 and 178 may each have a non-circular cross-sectional geometry; e.g., an oval cross-sectional geometry, an elliptical cross-sectional geometry, a pear-shaped cross-sectional geometry, a polygonal (e.g., rectangular) cross-sectional geometry, or any other symmetric or asymmetric shaped cross-sectional geometry with, for example, its major axis aligned (e.g., parallel) with the centerline 22.

Referring to FIG. 2, the heat shield 82 of the inner wall 76 circumscribes the shell 80 of the inner wall 76, and defines an inner side of the combustion chamber 56. The heat shield 82 of the outer wall 78 is arranged radially within the shell 80 of the outer wall 78, and defines an outer side of the combustion chamber 56 that is opposite the inner side. The heat shield 82 and, more particularly, each of the panels 148, 150 may be respectively attached to the shell 80 by a plurality of mechanical attachments 182; e.g., threaded studs respectively mated with washers and nuts. The shell 80 and the heat shield 82 thereby respectively form the cooling cavities 84-86 in each combustor wall 76, 78.

Referring to FIGS. 4-6, each cooling cavity 85 is defined and extends vertically between the interior surface 98 and a respective one of the interior surfaces 114 as set forth above. Each cooling cavity 85 is defined and extends circumferentially between the circumferential end rails 161 and 162 of a respective one of the panels 150. Each cooling cavity 85 is defined and extends axially between the axial intermediate and end rails 158 and 159 of a respective one of the panels 150. In this manner, each cooling cavity 85 may fluidly couple one or more of the cooling apertures 112, 140 and 142 in the shell 80 with one or more of the cooling apertures 174 in the heat shield 82.

During turbine engine operation, core air from the plenum 64 is directed into each cooling cavity 85 through respective cooling apertures 112, 140 and 142. The core air (e.g., cooling air) flowing through the cooling apertures 112 and 140 may impinge against the respective panel base 156, thereby impingement cooling the panel 150 and the heat shield 82. The cooling air flowing through the cooling apertures 142 may impinge against the respective body outer surfaces 144, thereby impingement cooling and/or film cooling the quench aperture bodies 88. In this manner, thermally induced stress within the quench aperture bodies 88 and/or adjacent portions of the panel base 156 may be reduced.

The cooling air within each cooling cavity 85 is directed through respective cooling apertures 174 and into the combustion chamber 56, thereby film cooling a downstream portion of the heat shield 82. Within each cooling aperture 174, the cooling air may also cool the heat shield 82 through convective heat transfer.

Figure 9:
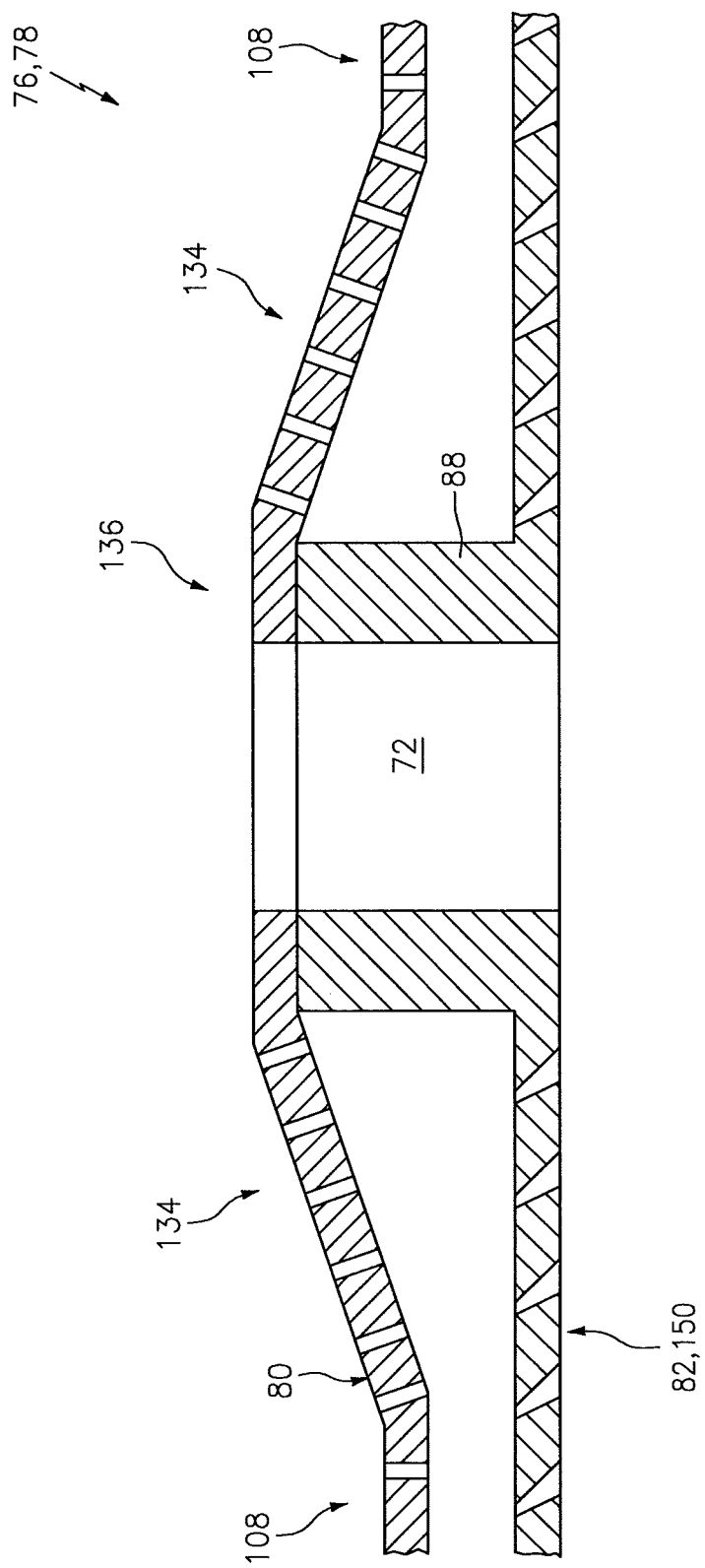
Figure 10:
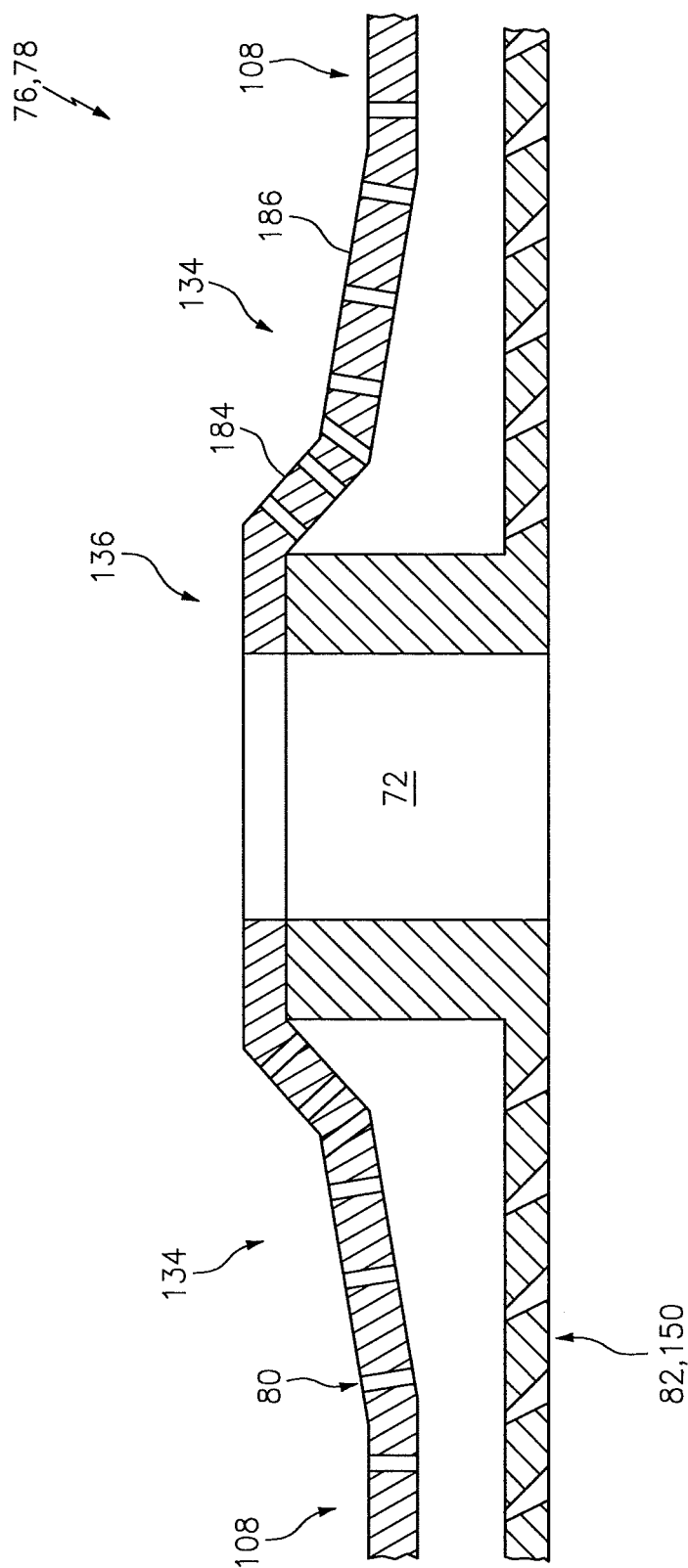

In some embodiments, referring to FIG. 6, one or more of the funnel-shaped portions 134 may each have an arcuate side-sectional geometry. In some embodiments, referring to FIG. 9, one or more of the funnel-shaped portions 134 may each have a substantially straight side-sectional geometry. In some embodiments, referring to FIG. 10, one or more of the funnel-shaped portions 134 may each have a compound side-sectional geometry. The funnel-shaped portion 134 of FIG. 10, for example, may include a plurality of sub-portions 184 and 186. Each sub-portion 184, 186 has a substantially straight side-sectional geometry. The first sub-portion 184, however, is obtusely (or acutely) angled relative to the second sub-portion 186. Of course, in other embodiments, one or more of the funnel-shaped portions 134 may each have a geometry that is different from those described above and illustrated in the drawings.

Figure 11:
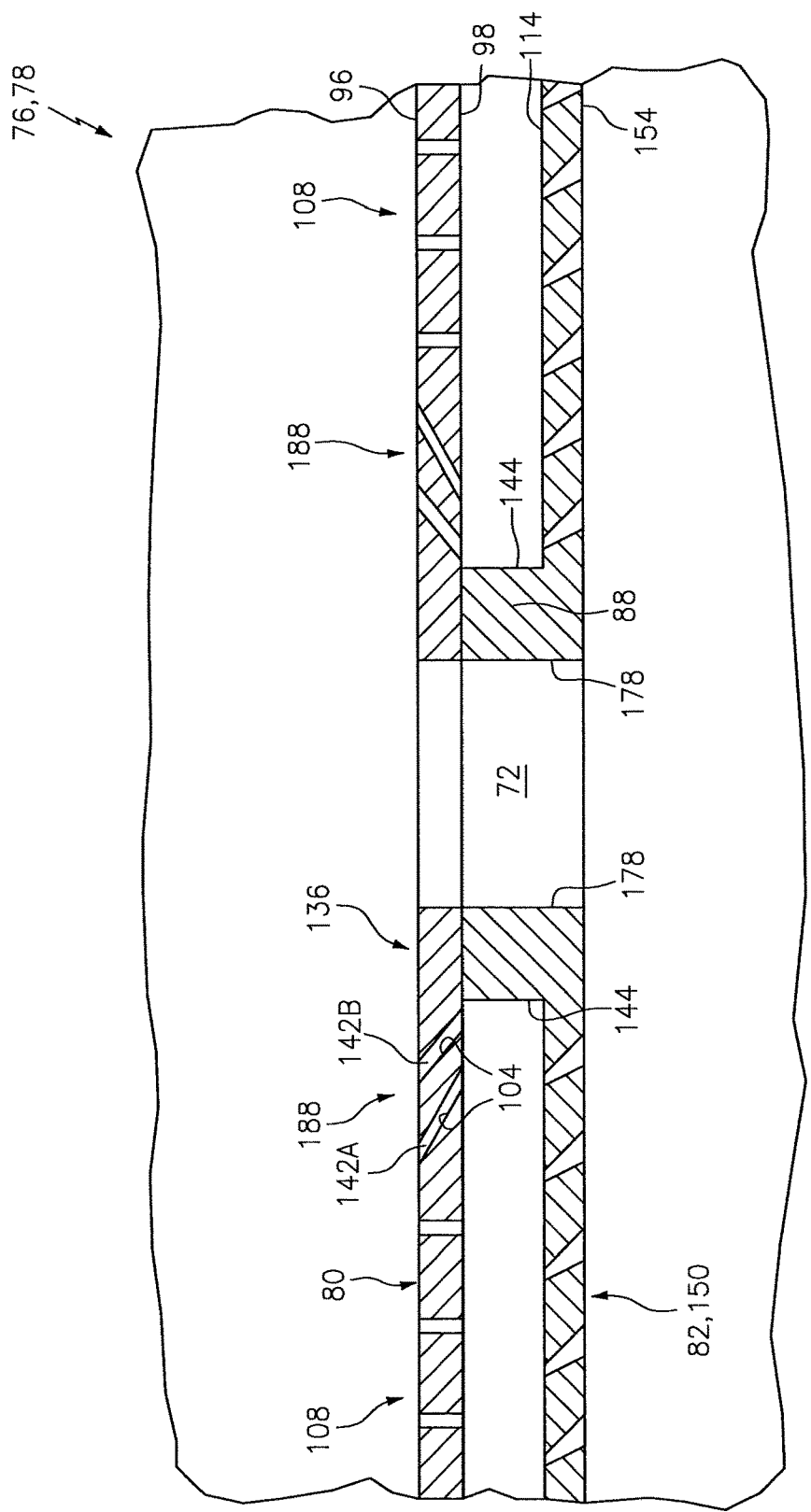

In some embodiments, referring to FIG. 11, one or more of the funnel-shaped portions 134 (see FIG. 6) may each be replaced with a substantially flat intermediate portion 188. This intermediate portion 188 may define one or more of the aperture surfaces 104 and, thus, one or more of the cooling apertures 142; e.g., cooling apertures 142A and 142B. To provide cooling to the respective quench aperture body 88, in the various embodiments of the present disclosure, each of the cooling apertures (e.g., 142A and 142B) extends along a centerline with a trajectory to the body outer surface 144. For example, each of the cooling apertures 142A and 142B may have a non-zero angle of incidence relative to the surfaces 96 and 98. The angle of incidence of the outer peripheral cooling apertures 142A, however, may be different (e.g., greater) than the angle of incidence of the inner peripheral cooling apertures 142B. For example, each outer peripheral cooling aperture 142A may have an angle of incidence between about seventy degrees) (70°) and about eighty degrees) (80°). Each inner peripheral cooling aperture 142B may have an angle of incidence between about fifty-five degrees) (55°) and about sixty-five degrees) (65°). The present invention, however, is not limited to the foregoing example.

Figure 12:
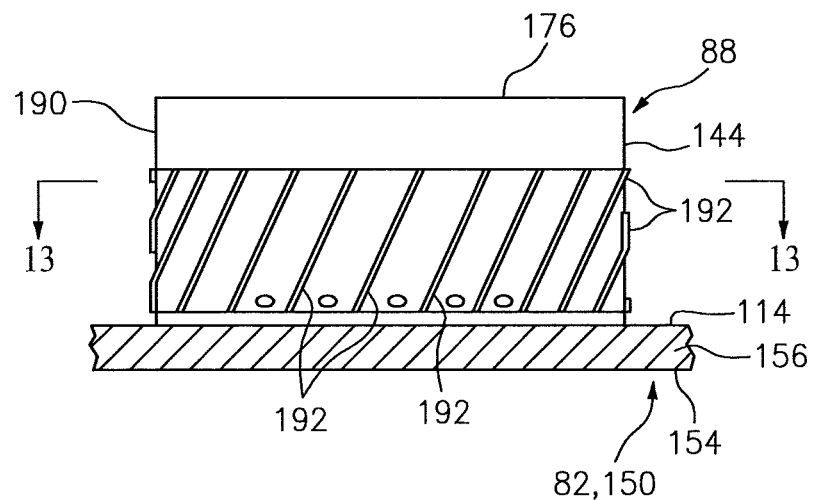
FIG. 12 is a side-sectional illustration of a portion of a heat shield configured with a quench aperture body.
Figure 13:
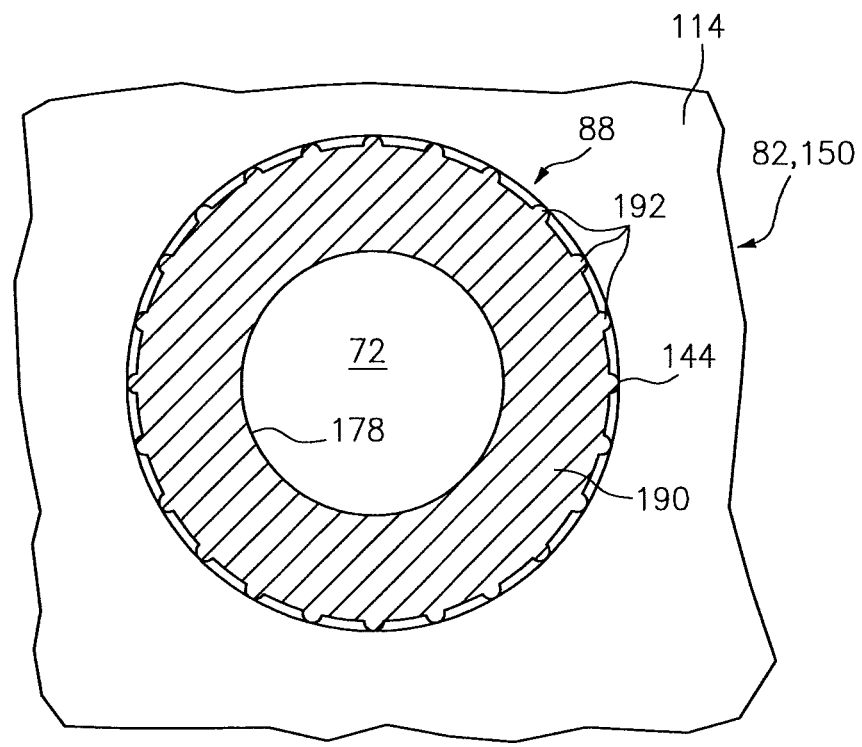
FIG. 13 is a cross-sectional illustration of the quench aperture body of FIG. 12.
Figure 14:
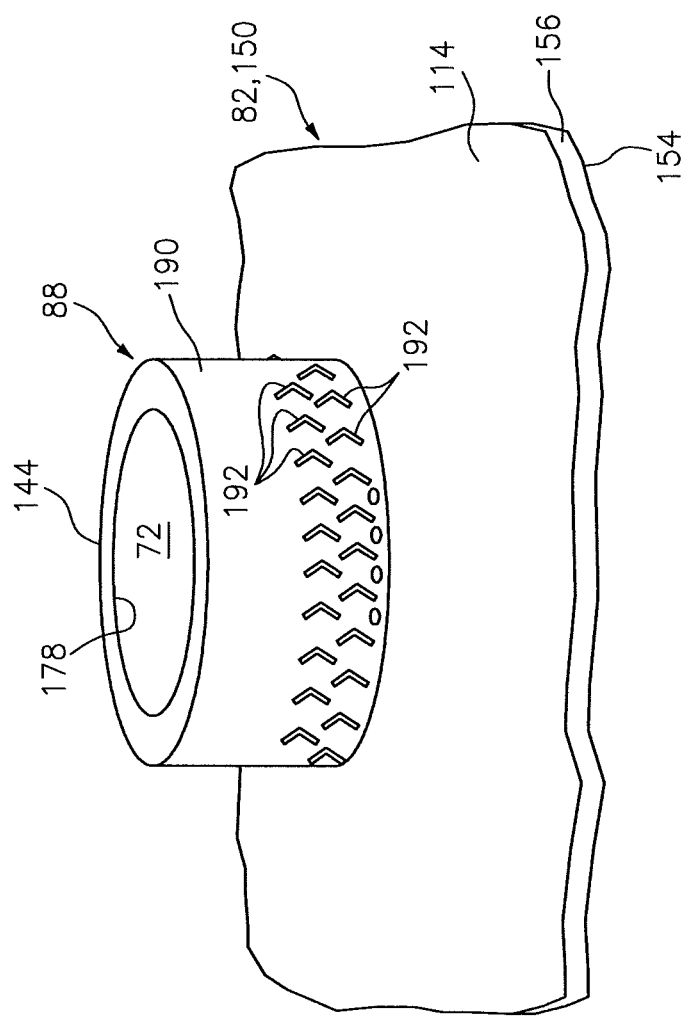
FIGS. 14-16 are perspective illustrations of respective portions of a heat shield configured with alternate embodiment quench aperture bodies.

In some embodiments, referring to FIGS. 12 and 13, one or more of the quench aperture bodies 88 may each include a base 190 configured with one or more ribs 192. These ribs 192 may be arranged around and connected to the base 190. The ribs 192 and the base 190 may collectively define the body outer surface 144. One or more of the ribs 192 may each be configured to spiral around the base 190 in a manner that directs cooling air towards the interior surface 114. The ribs 192 may also increase convective cooling of the respective quench aperture body 88 by increasing available heat transfer area of the outer surface 144 as well as turbulating the cooling air. The present invention, however, is not limited to the foregoing rib configuration. For example, in the embodiment of FIG. 14, one or more of the ribs 192 are each configured as a chevron. In addition, the ribs 192 are arranged into a plurality of circumferential arrays disposed vertically along the base 190.

Figure 15:
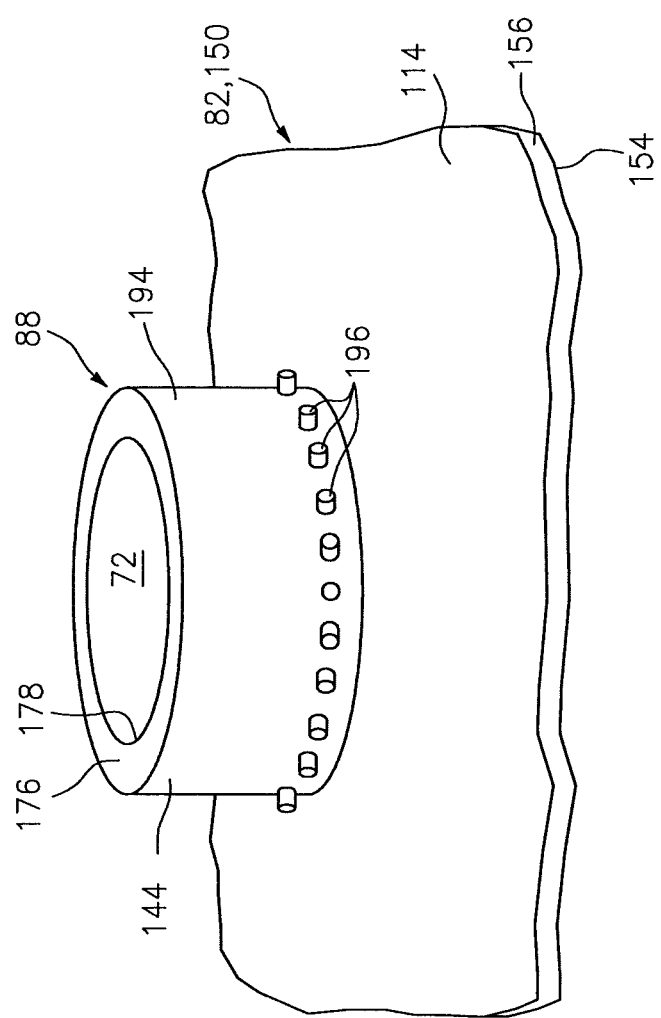

In some embodiments, referring to FIG. 15, one or more of the quench aperture bodies 88 may each include a base 194 configured with one or more point protrusions 196; e.g., pins, nodules, or any other type of cooling element. These point protrusions 196 may be arranged around and connected to the base 194. The point protrusions 196 and the base 194 may collectively define the body outer surface 144. The point protrusions 196 may also increase convective cooling of the respective quench aperture body 88 by increasing available heat transfer area of the outer surface 144 as well as turbulating the cooling air.

Figure 16:
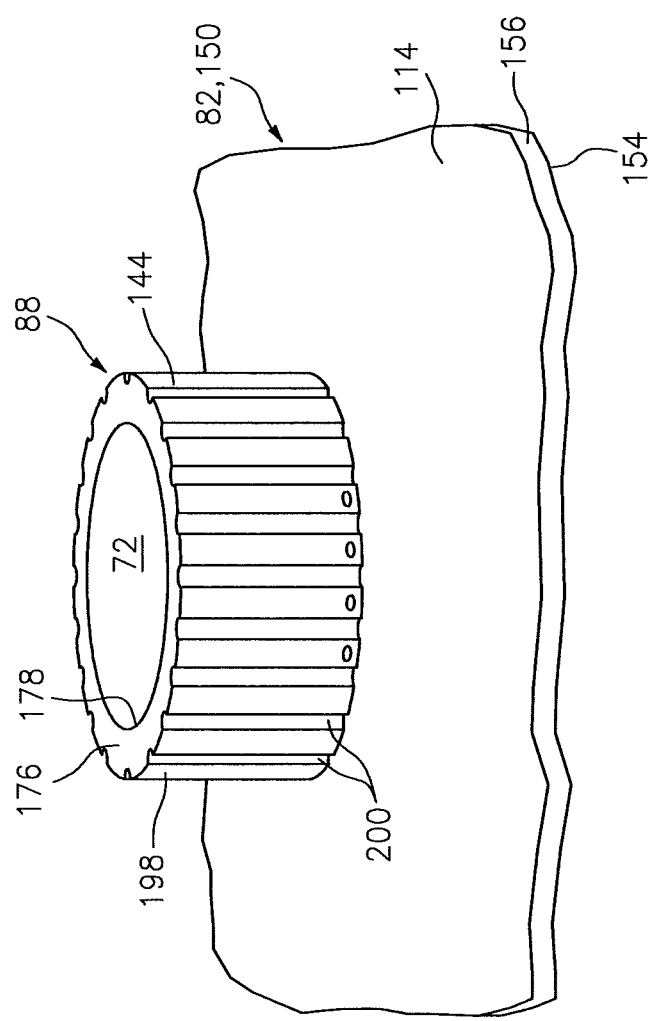

In some embodiments, referring to FIG. 16, one or more of the quench aperture bodies 88 may each include a base 198 configured with one or more channels 200, or any other type of indentation or recess that increase available heat transfer area of the outer surface 144. These channels 200 are defined by the body outer surface 144. Each channel 200 extends laterally into the base 198 from an outer periphery of the base 198. Each channel 200 may extend vertically into the base 198 from the distal end surface 176 to (or towards) the interior surface 114. The present invention, however, is not limited to the foregoing channel configuration.

Figure 17:
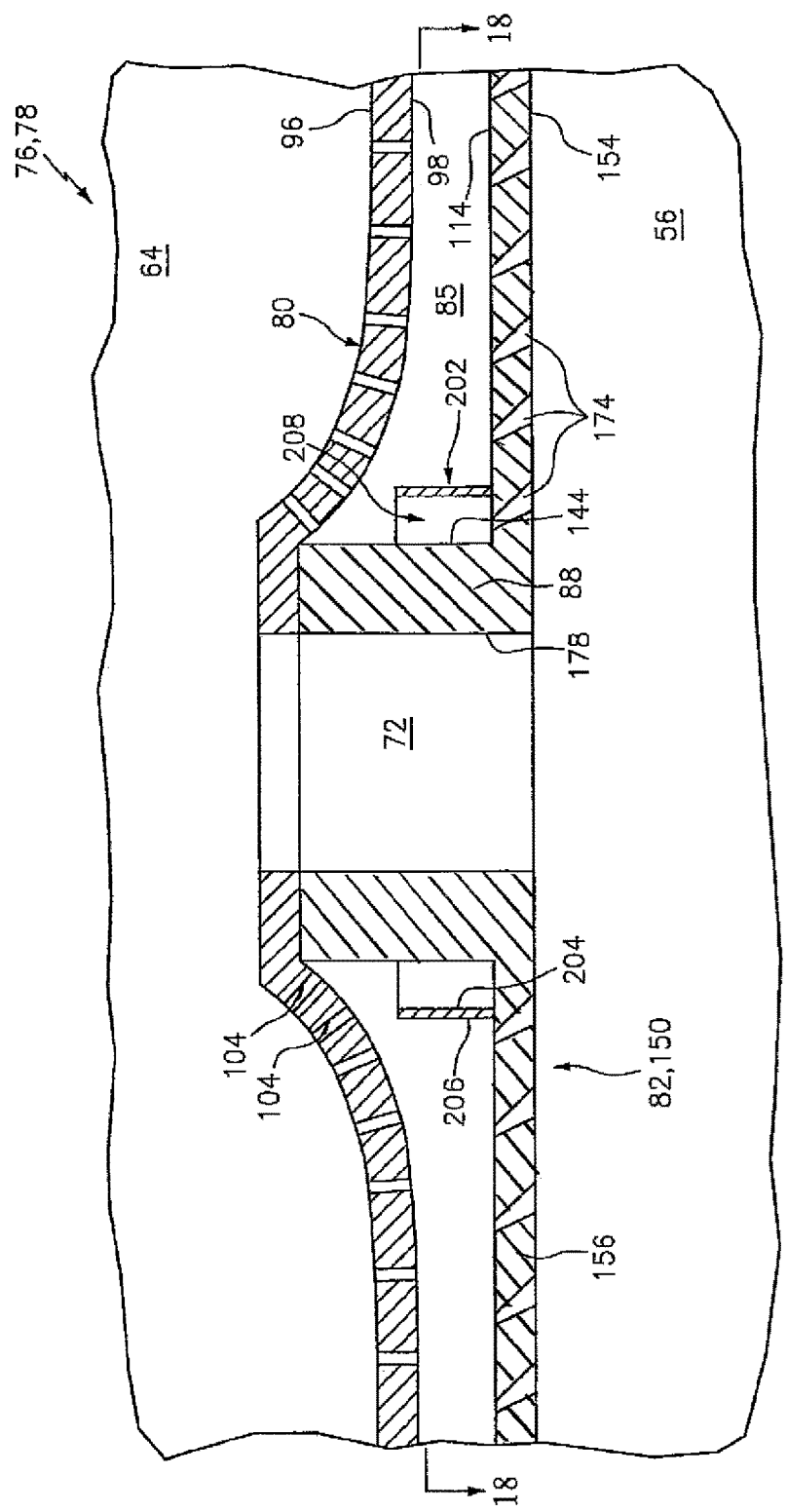
FIG. 17 is a side-sectional illustration of a portion of an alternate embodiment combustor wall.
Figure 18:
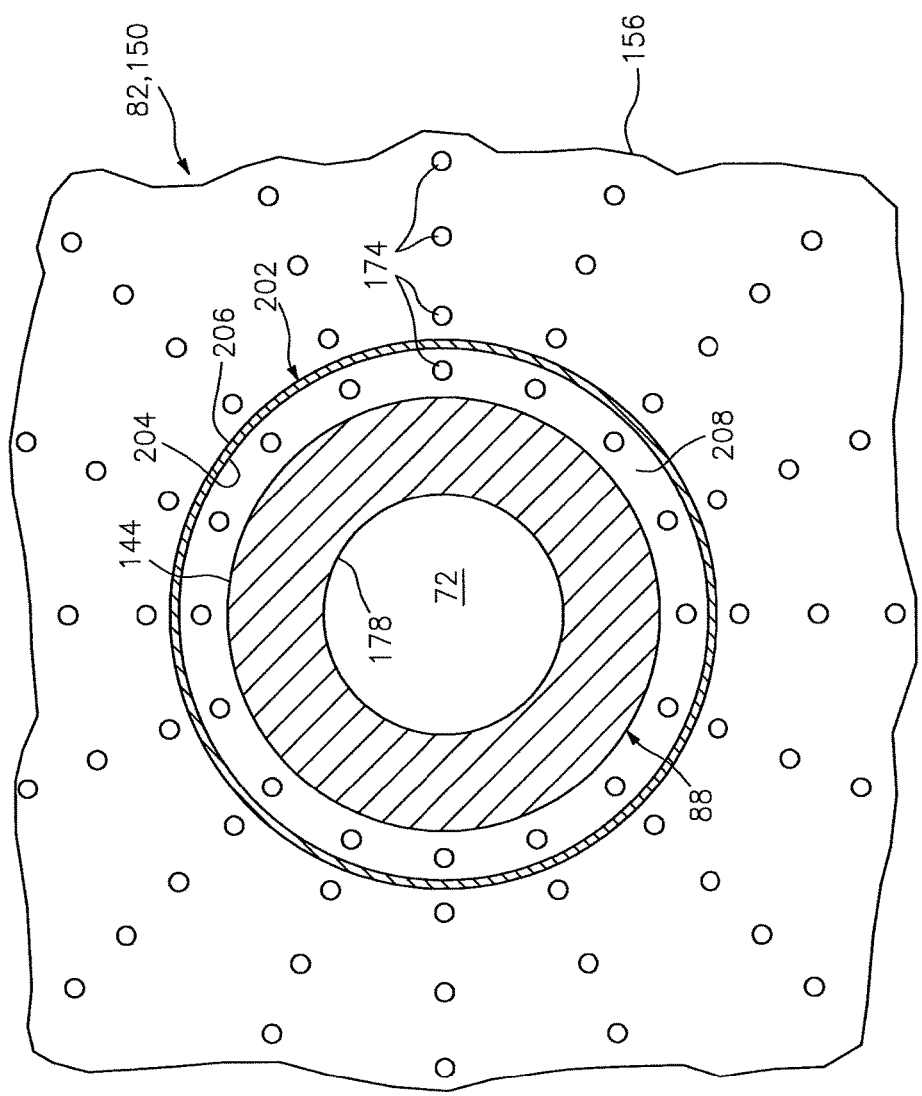
FIG. 18 is a sectional illustration of a portion of the combustor wall of FIG. 17.

In some embodiments, referring to FIGS. 17 and 18, the combustor wall 76, 78 may include one or more sleeves 202. Each sleeve 202 may be formed integral with or attached to the panel base 156 of a respective one the panels 150. Each sleeve 202 extends around a respective one of the quench aperture bodies 88. Each sleeve 202 extends vertically from the panel base 156 partially towards (or alternatively completely to) the shell 80. Each sleeve 202 extends laterally between an inner surface 204 and an outer surface 206. The sleeve inner surface 204 and the body outer surface 144 may define a spatial annular gap 208 (e.g., an air gap) laterally between the sleeve 202 and the quench aperture body 88. Alternatively, each sleeve 202 may engage (e.g., contact) or be closely fit with the respective quench aperture body 88 where, for example, the body 88 include one or more of the channels 200 (see FIG. 16). Referring again to FIGS. 17 and 18, during turbine engine operation, cooling air may flow into and accumulate within the gap 208 and thereby increase cooling of the quench aperture body 88 and/or an adjacent portion of the panel 150. This cooling air may subsequently be directed into the combustion chamber 56 to film cool the heat shield 82 through one or more of the cooling apertures 174 fluidly coupled with the gap 208; e.g., cooling apertures 174 with inlets laterally between the sleeve 208 and the quench aperture body 88.

The terms "forward", "aft", "inner", "outer", "radial", circumferential" and "axial" are used to orientate the components of the turbine engine assembly 60 and the combustor 62 described above relative to the turbine engine 20 and its centerline 22. One or more of these turbine engine components, however, may be utilized in other orientations than those described above. The present invention therefore is not limited to any particular spatial orientations.

The turbine engine assembly 60 may be included in various turbine engines other than the one described above. The turbine engine assembly 60, for example, may be included in a geared turbine engine where a gear train connects one or more shafts to one or more rotors in a fan section, a compressor section and/or any other engine section. Alternatively, the turbine engine assembly 60 may be included in a turbine engine configured without a gear train. The turbine engine assembly 60 may be included in a geared or non-geared turbine engine configured with a single spool, with two spools (e.g., see FIG. 1), or with more than two spools. The turbine engine may be configured as a turbofan engine, a turbojet engine, a propfan engine, or any other type of turbine engine. The present invention therefore is not limited to any particular types or configurations of turbine engines.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined within any one of the aspects and remain within the scope of the invention. A quench aperture body with any of the afore-described configurations, for example, may be arranged with a sleeve. Accordingly, the present invention is not to be restricted except in light of the attached claims and their equivalents.

What is claimed is:

1. An assembly for a turbine engine, the assembly comprising:
    a combustor wall including a shell, a heat shield and an annular body;
    the annular body extending a first height along a centerline from the heat shield to the shell through the combustor wall and at least partially defining a quench aperture along the centerline through the combustor wall;
    the shell defining a first cooling aperture radially outward of the annular body relative to the centerline and configured to direct air to impinge against a portion of the annular body between the heat shield and the shell; and
    a cooling cavity defined between the shell and the heat shield, the cooling cavity having a second height measured at a radial distance from the portion of the annular body, the second height is less than the first height,
    wherein a funnel-shaped portion of the shell extends around the annular body and defines the first cooling aperture, the funnel-shaped portion defined by the first height at the annular body and the second height at the radial distance around the annular body.

2. The assembly of claim 1, wherein the funnel-shaped portion of the shell has a substantially straight sectional geometry.

3. The assembly of claim 1, wherein the funnel-shaped portion of the shell has an arcuate sectional geometry.

4. The assembly of claim 1, wherein the funnel-shaped portion of the shell has a compound sectional geometry.

5. The assembly of claim 1, wherein
    the shell includes a second portion;
    the funnel-shaped portion extends laterally from the second portion towards the annular body; and
    the second portion is substantially parallel with an opposing portion of the heat shield.

6. The assembly of claim 1, wherein the funnel-shaped portion of the shell is non-parallel with an opposing portion of the heat shield, and the funnel-shaped portion of the shell defines the first cooling aperture.

7. The assembly of claim 1, wherein a first angle of incidence is defined relative to a centerline of the first cooling aperture and a surface of the shell.

8. The assembly of claim 7, wherein
    the shell further defines a second cooling aperture through which air is directed to impinge against an outer surface of the portion of the annular body; and
    a second angle of incidence is defined relative to a centerline of the second cooling aperture and the surface of the shell, and the second angle of incidence is different than the first angle of incidence.

9. The assembly of claim 1, wherein the portion of the annular body includes an outer surface which defines a rib.

10. The assembly of claim 9, wherein at least a portion of the rib comprises a chevron.

11. The assembly of claim 1, wherein the portion of the annular body includes an outer surface which defines a point protrusion.

12. The assembly of claim 1, wherein the portion of the annular body includes an outer surface which defines a channel extending into the body.

13. The assembly of claim 1, further comprising a sleeve extending around the annular body and extending vertically from the heat shield towards the shell.

14. The assembly of claim 1, wherein the heat shield includes a plurality of panels that are attached to the shell, and the annular body is connected to one of the panels.

15. The assembly of claim 1, further comprising:
    a second combustor wall; and
    a combustor bulkhead that extends between the combustor wall and the second combustor wall;
    wherein the heat shield, the second combustor wall and the combustor bulkhead define a combustion chamber.

16. The assembly of claim 1, wherein the first cooling aperture extends along an axis with a trajectory to the annular body, and the first cooling aperture is fluidly coupled with the cooling cavity between the shell and the heat shield.

17. An assembly for a turbine engine, the assembly comprising:
    a combustor wall including a shell, a heat shield and an annular body;
    the annular body extending a first height between the shell and the heat shield and defining a quench aperture in the combustor wall; and
    a cooling cavity defined between the shell and the heat shield, the cooling cavity having a second height measured at a radial distance from the annular body, the second height is less than the first height,
    wherein a funnel-shaped portion of the shell extends around the annular body and defines a cooling aperture fluidly coupled with the cooling cavity, the funnel-shaped portion defined by the first height at the annular body and the second height at the radial distance around the annular body.

18. The assembly of claim 17, wherein the funnel-shaped portion of the shell is adapted to direct air through the cooling aperture and into the cooling cavity to impinge against the annular body.

* * * * *